(12) United States Patent
Schade

(10) Patent No.: US 11,371,930 B2
(45) Date of Patent: Jun. 28, 2022

(54) METHOD, APPARATUS AND SYSTEM FOR EXAMINATION OF A FREE-FLOWING SAMPLE

(71) Applicant: Deere & Company, Moline, IL (US)

(72) Inventor: Peter Schade, Bad Dürkheim (DE)

(73) Assignee: DEERE & COMPANY, Moline, IL (US)

( * ) Notice: Subject to any disclaimer, the term of this patent is extended or adjusted under 35 U.S.C. 154(b) by 80 days.

(21) Appl. No.: 16/584,919

(22) Filed: Sep. 26, 2019

(65) Prior Publication Data
US 2020/0096439 A1    Mar. 26, 2020

(30) Foreign Application Priority Data

Sep. 26, 2018  (DE) .......................... 102018216498.3

(51) Int. Cl.
| | | |
|---|---|---|
| *G01N 21/00* | (2006.01) | |
| *G01N 21/05* | (2006.01) | |
| *G01N 21/359* | (2014.01) | |
| *G01N 21/3563* | (2014.01) | |
| *G01N 21/3577* | (2014.01) | |

(52) U.S. Cl.
CPC ........... *G01N 21/05* (2013.01); *G01N 21/359* (2013.01); *G01N 21/3563* (2013.01); *G01N 21/3577* (2013.01)

(58) Field of Classification Search
CPC .. G01N 21/05; G01N 21/359; G01N 21/3563; G01N 21/3577; G01N 2021/052; G01N 21/85
See application file for complete search history.

(56) References Cited

U.S. PATENT DOCUMENTS

| | | | |
|---|---|---|---|
| 4,398,894 A | * | 8/1983 | Yamamoto ............. G01N 15/04 422/73 |
| 5,092,819 A | | 3/1992 | Schroeder et al. |
| 5,385,143 A | * | 1/1995 | Aoyagi .............. A61B 5/14551 356/41 |
| 5,414,508 A | | 5/1995 | Takahashi et al. |

(Continued)

FOREIGN PATENT DOCUMENTS

| | | |
|---|---|---|
| DE | 10318942 A1 | 11/2004 |
| DE | 102004010772 A1 | 10/2005 |

(Continued)

OTHER PUBLICATIONS

European Search Report issued in counterpart European Patent Application No. 19198691.8, dated Dec. 9, 2019 (4 pages).

(Continued)

*Primary Examiner* — Kiho Kim
(74) *Attorney, Agent, or Firm* — Hanley, Flight & Zimmerman, LLC

(57) ABSTRACT

An apparatus for examination of a free-flowing sample, comprising: a measuring chamber for receiving the sample, the measuring chamber having at least a portion which is transmissive to light of a spectral range; a casing configured to at least partially enclose the measuring chamber, the casing having at least of portion of its inner surface with a reflectivity in the spectral range; a light source for applying light of the spectral range to the measuring chamber; and a sensor for detecting light of the light source reflected by the sample.

23 Claims, 1 Drawing Sheet

(56) References Cited

U.S. PATENT DOCUMENTS

| | | | | |
|---|---|---|---|---|
| 5,760,911 A | * | 6/1998 | Santschi | ............. G01N 21/534 356/438 |
| 2017/0285057 A1 | * | 10/2017 | Andersen | ........... G01N 21/3577 |

FOREIGN PATENT DOCUMENTS

| | | |
|---|---|---|
| DE | 102008001783 A1 | 11/2009 |
| DE | 102010062417 A1 | 6/2011 |
| DE | 102010043131 A1 | 5/2012 |
| DE | 202018002521 U1 | 7/2018 |
| EP | 0908086 A1 | 4/1999 |
| EP | 1454519 A1 | 9/2004 |
| EP | 2846161 A1 | 3/2015 |
| WO | 2005083386 A1 | 9/2005 |
| WO | 2012062829 A1 | 5/2012 |
| WO | 2015071706 A1 | 5/2015 |

OTHER PUBLICATIONS

European Patent Office, "Communication to applicant regarding observations by third parties," issued in connection with European Application No. 19198691.8, dated Sep. 4, 2020, 4 pages, (translation not available).

Villanueva et al., "Measuring absorption coefficient of scattering liquids using a tube inside an intergrating sphere," Applied Optics, vol. 55, No. 11, dated Apr. 10, 2016, 9 pages.

European Patent Office, "Invitation to file a copy of search results," issued in connection with European Application No. 19198691.8, dated Oct. 13, 2020, 1 page, (translation not available).

* cited by examiner

METHOD, APPARATUS AND SYSTEM FOR EXAMINATION OF A FREE-FLOWING SAMPLE

TECHNICAL FIELD

A method, apparatus and system for examination of a free-flowing sample.

BACKGROUND

There is an array of applications in food science or agriculture, in which constituents of a free-flowing sample are to be detected. In this case, this can relate, for example, to liquid agricultural products such as milk or wine, in which fat content or alcohol content are to be detected as constituents, or byproducts, such as liquid manure, in which, inter alia, the nitrogen content is to be measured as a constituent, or pourable (grainy) products, such as grain, the content of protein of which is to be studied. In particular near infrared technology has proven itself as a technology for the constituent determination in the case of such free-flowing samples. For this purpose, the sample to be examined is irradiated using broadband light or light consisting of discrete wavelengths (or successively using light of different wavelengths), the wavelength of which is in the visible and/or near infrared range. The light reflected and/or transmitted by the sample is detected in a wavelength-specific manner by a detector and the obtained spectra are analyzed on the basis of calibration curves to finally ascertain the content of the sample of the constituent to be sensed. The measured content can be used to control an operating parameter, such as the discharge rate of a distribution vehicle in the case of liquid manure, or it is stored for documentation purposes.

The sensor used for the constituent detection of the sample is typically positioned on a flow line or passageway, through which a material flow forming and/or containing the sample is conveyed in a machine, as in the case of a distribution vehicle for liquid manure on a flow line between a tank and the discharge elements (German Patent Application No. DE 103 18 942 A1), or in the case of a combine harvester on a filling pipe of the grain tank (U.S. Pat. No. 5,092,819 A). It has also been proposed that the sensor used for the constituent detection of the sample be attached adjacent to a sample chamber, into which the sample taken from the main flow of the material to be examined is continuously or discontinuously poured, for which purpose a pump is typically used in the case of liquid manure (German Patent Application No. DE 20 2018 002 521 U1, WO 2005/083386 A1), or to immerse the sensor in a tank which contains the sample (German Patent Application No. DE 10 2010 043 131 A1).

An analyzer for grain is described in WO 2015/071706 A1, which comprises a chamber into which a sample of the grain to be examined is poured. The chamber is diffusely illuminated by a light source and a spectral sensor detects the light spectrally filtered (i.e., reflected or transmitted) by the sample. The inner surface of the chamber is embodied as reflective to increase the intensity of the light detected by the sensor.

SUMMARY

Various aspects of examples of the present disclosure are set forth in the claims. An apparatus for examination of a free-flowing sample, comprising: a measuring chamber for receiving the sample, the measuring chamber having at least a portion which is transmissive to light of a spectral range; a casing configured to at least partially enclose the measuring chamber, the casing having at least of portion of its inner surface with a reflectivity in the spectral range; a light source for applying light of the spectral range to the measuring chamber; and a sensor for detecting light of the light source reflected by the sample.

An agricultural implement system, the system comprising: an agricultural implement; a sample apparatus associated with the agricultural implement, the sample apparatus comprising: a measuring chamber for receiving a free-flowing sample, the measuring chamber having at least a portion which is transmissive to light of a spectral range; a casing configured to at least partially enclose the measuring chamber, the casing having at least of portion of its inner surface with a reflectivity in the spectral range; a light source for applying light of the spectral range to the measuring chamber; and a sensor for detecting light of the light source reflected by the sample. The system further comprising a processing unit for receiving a signal from the sample apparatus and controlling an operation of the agricultural implement.

A method for sensing a characteristic of a free-flowing sample, the method comprising the steps of: providing a measuring chamber for receiving the sample, the measuring chamber having at least a portion which is transmissive to light of a spectral range; providing a casing configured to at least partially enclose the measuring chamber, the casing having at least of portion of its inner surface proximate the measuring chamber with a reflectivity in the spectral range; moving the sample through the measuring chamber; emitting, with a light source, a light of the spectral range onto the sample as it moves through the measuring chamber; detecting, with a sensor, light reflected by the sample as it moves through the measuring chamber; and calculating, with a processing unit, a characteristic of the sample using the detected light reflected by the sample.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 2:
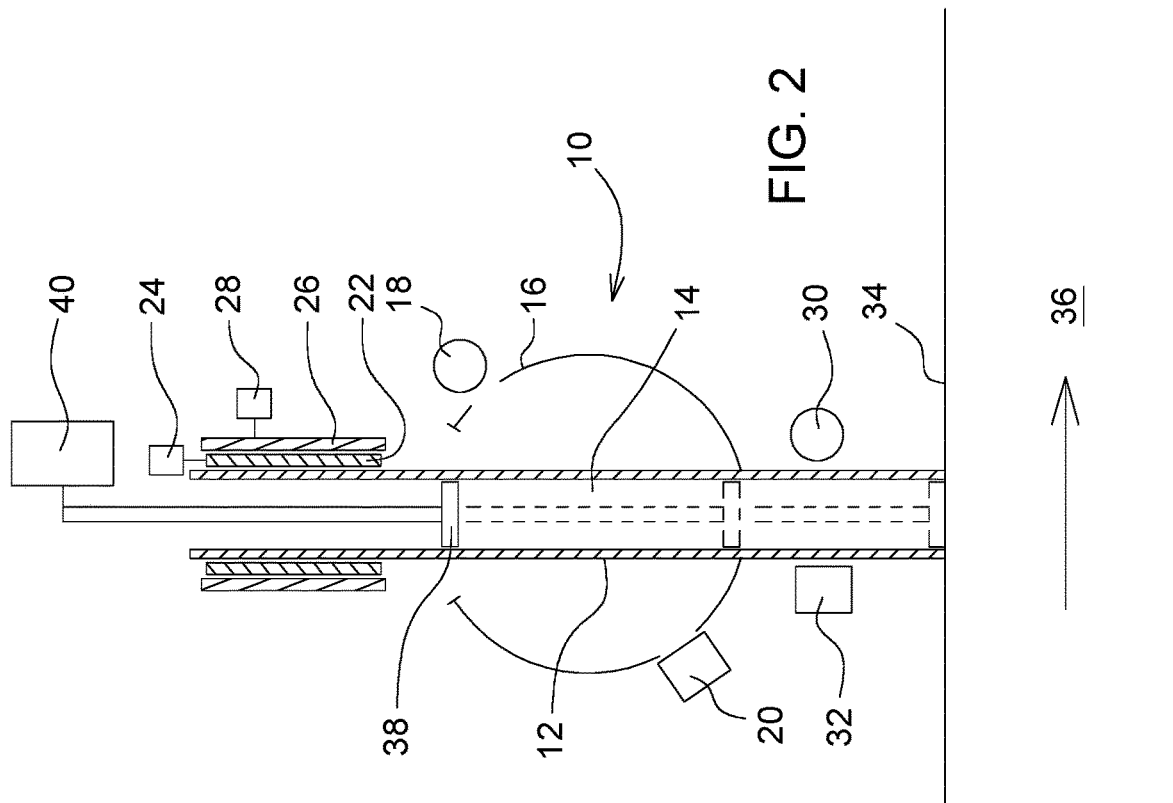
FIG. 2 shows a schematic section of a second embodiment of a method, apparatus and system for the examination of a free-flowing sample.

The object on which the invention is based is considered that of providing a method, apparatus and system for the examination of a free-flowing sample, which does not have certain disadvantages or has them to a reduced extent. For example, in the case of the sensing of the constituents of particularly dark samples, e.g., liquid manure, the problem exists that the sensitivity of reflection measurement is not as good as that of transmission measurements, however, transmission measurements are more difficult to carry out because of lower transmissions, which are different in different samples, of the materials to be examined. Accordingly, adjustable gaps are required for transmission measurements and the gaps threaten to clog when they become small. Therefore, quite long measurement times are necessary to separate the useful signal from the noise. The arrangement described in WO 2015/071706 A1 requires a manual introduction of the sample into the chamber and is thus not suitable for attachment to a machine having automatic sample feed.

It is proposed that a measuring chamber fillable with the sample be enclosed using an internally reflective casing. In one example, the casing is preferably at least approximately spherical. The sample is illuminated using the light from a light source through the walls of the measuring chamber, which are at least partially transmissive in the spectral range used. The casing acts as an Ulbricht sphere and ensures diffuse illumination of the measuring chamber using the light from the light source. In the measuring chamber, the light interacts with the sample, wherein the interaction consists of both light transmission and also light reflection. Due to the interaction between sample and light, a spectral distribution of the light results in the casing which is determined by the properties of the sample. The sensor measures the spectral light distribution in the sample chamber. In this manner, the measuring time is shortened, in particular in the case of dark samples, such as liquid manure, and/or the measurement accuracy is improved by the integration effect of the casing, while the measuring chamber provided with walls separate from the casing (in contrast to the prior art according to WO 2015/071706 A1) not only permits manual filling, but rather also enables machine filling of the arrangement with the sample. The signals of the sensor can be used to control an operating parameter of an (in particular agricultural) machine, such as the discharge rate of a distribution vehicle in the case of liquid manure, or they are stored for documentation purposes.

The light source can be configured to emit multiple different wavelengths (in particular lying in the visible and/or near infrared range) of the spectral range simultaneously or successively and the sensor can be configured to sense multiple wavelengths simultaneously or successively in a spectrally-resolved manner. The sensor thus provides spectra (i.e., items of information on the reflectivity and/or transmission of the sample at different wavelengths), which can be used by an analysis or processing unit in a manner known per se in conjunction with calibration data to ascertain one or more constituents of the sample.

A standard (e.g., a reference with one or more shapes, surfaces, colors or patterns) for referencing the sensor can optionally be able to be pushed over the measuring chamber, for which purpose a drive can be provided for moving the standard between an active position, in which the standard is pushed over the measuring chamber, and an inactive position, in which the standard is spaced apart from the measuring chamber. A standard could also be guided into the measuring chamber.

The sample can be conveyed into the measuring chamber and subsequently emptied from the measuring chamber in a number of ways. In one example, the measuring chamber can be a component of a flow line (e.g., passageway, chute, pipe, throughway, channel, conduit, duct, tube) system, through which the sample can be flows. A conveyor can then transport the sample through the line into the measuring chamber and also empty the sample from the measuring chamber through the same line or a different line(s). In another embodiment, a movable piston conveys the sample into the measuring chamber and empties the measuring chamber. For example, a hydraulic or electric drive can be used to move the piston between a position for emptying the measuring chamber and an idle position. The above-mentioned standard could be fastened on the rear side of the piston, so that referencing can be carried out with each emptying procedure.

Figure 1:
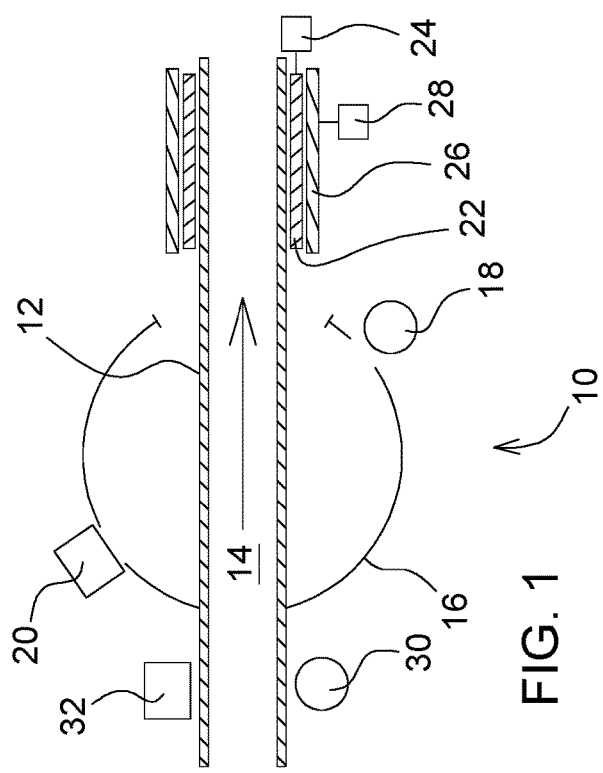
FIG. 1 shows a schematic section of a first embodiment of a method, apparatus and system for the examination of a free-flowing sample.

FIG. 1 shows a schematic view of a first embodiment of an apparatus 10 for the sensory examination of a free-flowing sample. The apparatus 10 comprises a measuring chamber 14, which is enclosed in the radial direction by walls 12. The cross section of the measuring chamber 14 can be circular or rectangular or square. The measuring chamber 14 is enclosed by a spherical casing 16, symmetrically in relation to the axis of the measuring chamber 14. Light is applied to the interior of the casing 16 and thus the measuring chamber 14 by a light source 18 through a hole in the casing 16. A sensor 20 is arranged diametrically opposite to the light source 18 and views the measuring chamber 14 through a further hole in the casing 16. The sensor 20 accordingly does not receive light directly from the light source 18. In the extreme case, the measuring chamber 14 could also comprise two parallel plates, which are arranged between two halves of the casing 16. One would then have solely a transmission measurement.

The light source 18 provides broadband light (for example, in that it is embodied as a halogen lamp) or light of different wavelengths simultaneously or successively (in that it comprises one or more semiconductor elements, for example, light-emitting diodes or lasers, for different wavelengths). The light source 18 can be equipped with a special diffuser. This is, for example, a hemisphere, which is mounted closely in front of the light source 18, between light source 18 and measuring chamber 14, and which distributes the light homogeneously in the casing 16. The sensor 20 can detect the intensities simultaneously or successively for different wavelengths, i.e., it can sense the intensity of the light reflected and/or transmitted by a sample contained in the measuring chamber 14 in a wavelength-resolved manner. The light source 18 and the sensor 20 accordingly form a spectrometric arrangement, which operates in particular in the near infrared range. An analysis or processing unit (not shown in FIG. 1) can analyze the signals of the sensor 20 using calibration data to determine the component of the sample of arbitrary constituents and thus a characteristic of the sample.

The casing 16 is embodied as internally reflective at least for the spectral range used by the sensor 20. For this purpose, it can be equipped with a suitable coating, for example, made of gold, or any other suitable material. Due to the reflective and light-integrating effect of the casing 16, on the one hand, the light of the light source 18 is made diffuse, which results in a homogeneous illumination of the sample in the measuring chamber 14 and, on the other hand, the intensity of the light reaching the sensor 20, which is spectrally influenced (reflected and/or transmitted) by the sample in the measuring chamber 14, is increased in relation to an apparatus 10 without such a casing 16, which also improves the sensitivity and accuracy of the apparatus 10. Outshining of the light spectrally influenced by the sample in the measuring chamber 14 by the direct light of the light source 18 is avoided by an optional positioning of the sensor 20 diametrically opposite to the light source 18. For this purpose, reference is also made to the statements in WO 2015/071706 A1, the content of the disclosure of which is incorporated by reference into the present documents. Multiple sensors 20 and/or light sources 18, which each use various spectral ranges, could also be distributed over the casing 16.

To reference the spectrometer, a first standard 22 and, if needed, a second standard 26 can be pushed from the outside over the walls 12 of the measuring chamber 14, for which purpose separate drives 24 and 28 are provided. The first standard 22 can be a white standard and the second standard 28 a black standard or vice versa. The black standard could optionally also be omitted by switching off the light source 18.

To be able to determine the transmission (light transmissivity) of the sample, a second light source 30 and a second sensor 32 can be mounted upstream or downstream of the measuring chamber 14 in the movement direction of the sample, which is shown by the arrow in FIG. 1. The second sensor 32 can be embodied solely as an intensity sensor (photodiode or phototransistor). The solid component of the sample, for example, if it is liquid manure, can be determined by a second light source 30 and the second sensor 32 on the basis of the transmissivity of the sample for the light.

As shown by the arrow in FIG. 1, the sample flows through the measuring chamber 14. The sample can be any arbitrary medium to be examined which is free-flowing. Non-restrictively, it can be a liquid, such as liquid manure or milk, or a grainy medium such as grain or chopped plants. The measuring chamber 14 can be incorporated into a (in particular agricultural) machine in a flow line in which the medium, for example, harvested material or liquid manure, is conveyed (see U.S. Pat. No. 5,092,819 A, German Patent Application No. DE 20 2018 002 521 U1, German Patent Application No. DE 103 18 942 A1, or German Patent Application No. DE 10 2004 010 772 A1), or it is incorporated into a branch line (bypass), through which the material is poured in and removed again continuously (as described in WO 2005/083386 A1, German Patent Application No. DE 10 2008 001 783 A1, or German Patent Application No. DE 10 2010 062 417 A1) or discontinuously at regular time intervals (see European Patent Appl. No. EP 0 908 086 A1 or European Patent Appl. No. EP 1 454 519 A1).

FIG. 2 shows a second embodiment of an apparatus 10 for the sensory examination of a free-flowing sample, in which the sample is taken at regular time intervals by a piston 38 from a main flow 36 of the material, which is conveyed in a line 34, and introduced again after the measurement. The piston 38 is movable by a drive 40 between an idle position, in which it is shown by solid lines in FIG. 2, and in which the sample enters the measuring chamber 14 due to the suction of the piston 38 and the pressure of the material in the main flow 36, and an ejection position, in which the piston 38 is located in one of the positions shown by dashed lines at the lower end of the measuring chamber 14 or at the inlet of the line 34. The piston 38 also has a cleaning action for the inner walls of the measuring chamber 14 and removes possible clogs of the measuring chamber 14, so that only individual incorrect measurements or none at all occur. The apparatus 10 shown in FIG. 2 is suitable for sensing the above-mentioned materials and in particular for liquid manure, which is conveyed in relatively thick lines 34 having diameters of 15 to 20 cm, while the diameters of the measuring chamber 14 suitable for near infrared spectroscopy are in the ranges of several centimeters. One of the standards 22 or 26, in contrast to FIG. 2, could be fastened on the rear side of the piston 38 spaced apart from the material to be examined and can be inserted into the measuring chamber 14 every time the latter is emptied, to enable referencing of the sensor 20.

It would be conceivable in the apparatus 10 according to FIG. 2 to also introduce a screen or a pulverizing unit for the material to be examined between the transition between the measuring chamber 14 and the line 34, so that larger particles cannot enter the measuring chamber 14. For this purpose, reference is made to the disclosure of WO 2005/083386 A1, which is incorporated by reference into the present documents. Moreover, a temperature sensor for detecting the temperature of the sample in the measuring chamber 14 can be associated with the measuring chamber 14.

The apparatus 10 of FIG. 2 can accordingly be attached particularly advantageously on a machine for discharging liquid manure at the point in the line system shown in German Patent Application No. DE 103 18 942 A1 between a tank and the discharge unit of a vehicle for discharging liquid manure and the signals of the sensor 20 can be used to monitor the discharge rate, or it is attached to a tank containing the liquid manure. Alternatively or additionally, the signals of the sensor 20 or values derived therefrom are stored in geo-referenced form for documentation purposes.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory (ies) into other data similarly represented as physical quantities within the computer system's and/or computing element's memory(ies), register(s) and/or other such information storage, processing, transmission, and/or display components of the computer system(s), computing element (s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. An apparatus for examination of a free-flowing sample, comprising:
   a measuring chamber for receiving the sample, wherein at least a portion of the measuring chamber is transmissive to a first light of a spectral range from a first light source;
   a casing configured to at least partially enclose the measuring chamber, the casing having at least of portion of its inner surface with a reflectivity in the spectral range;
   a first sensor for detecting the first light of the first light source reflected by the sample inside the measuring chamber;
   a piston moveable within the measuring chamber between an emptying position and an idle position, the piston in the emptying position to cause emptying of the measuring chamber;
   a standard coupled to the piston, the standard to enable referencing of the first sensor when the piston is in the emptying position;
   a second light source upstream of the measuring chamber; and a second sensor for detecting a second light from the second light source, the second light indicative of a transmissivity of the sample.

2. The apparatus of claim 1, wherein the casing is at least approximately spherical.

3. The apparatus of claim 1, wherein the first light source is configured to emit at least two different wavelengths of the spectral range in at least one of a simultaneous or successive pattern and the first sensor is configured to sense the at least two wavelengths in the at least one of the simultaneous or successive pattern.

4. The apparatus of claim 3, wherein the at least two wavelengths are resolved by the first sensor or a processing unit associated with the first sensor.

5. The apparatus of claim 1, wherein the standard is movable proximate to or inside the measuring chamber.

6. The apparatus of claim 5, further including a drive associated with the standard, the drive configured to move the standard between an active position, in which the standard is pushed proximate to or inside the measuring chamber, and an inactive position, in which the standard is spaced apart from the measuring chamber.

7. The apparatus of claim 1, further including a conveyor, the conveyor configured to move the sample into and out of the measuring chamber.

8. The apparatus of claim 7, wherein the measuring chamber is integrated into a flow line and the conveyor is configured to move the sample through the measuring chamber in the flow line.

9. The apparatus of claim 1, further including a drive for moving the piston between the emptying position and the idle position.

10. The apparatus of claim 1, wherein signals of the first and second sensors used to control a discharge rate of an agricultural vehicle.

11. The apparatus of claim 1, wherein the standard is a first standard, further including a second standard movable relative to the first standard, the first and second standards having different colors.

12. The apparatus of claim 1, wherein the measuring chamber is separate from a flow line of the free-flowing sample, the piston to transfer the free-flowing sample from the flow line to the measuring chamber.

13. The apparatus of claim 12, further including a pulverizing unit operatively coupled between the flow line and the measuring chamber.

14. An agricultural implement system, the agricultural implement system comprising:
an agricultural implement;
a sample apparatus associated with the agricultural implement, the sample apparatus comprising:
a measuring chamber for receiving a free-flowing sample, wherein at least a portion of the measuring chamber is transmissive to a first light of a spectral range from a first light source;
a casing configured to at least partially enclose the measuring chamber, the casing having at least of portion of its inner surface with a reflectivity in the spectral range;
a first sensor for detecting the first light of the first light source reflected by the sample in the measuring chamber;
a piston moveable within the measuring chamber between an emptying position and an idle position, the piston in the emptying position to cause emptying of the measuring chamber;
a standard coupled to the piston, the standard to enable referencing of the first sensor when the piston is in the emptying position;
a second light source upstream of the measuring chamber;
a second sensor for detecting a second light from the second light source, the second light indicative of a transmissivity of the sample; and
a processing unit for receiving a signal from the sample apparatus and controlling an operation of the agricultural implement.

15. The agricultural implement system of claim 14, wherein the agricultural implement has at least one actuator, the processing unit configured to receive the signal from the sample apparatus and send a command to the at least one actuator to perform the operation of the agricultural implement.

16. A method for sensing a characteristic of a free-flowing sample, the method comprising:
providing a measuring chamber for receiving the sample, wherein at least a portion of the measuring chamber is transmissive to a first light of a spectral range from a first light source;
providing a casing configured to at least partially enclose the measuring chamber, wherein at least a portion of an inner surface of the casing has a reflectivity in the spectral range;
moving the sample through the measuring chamber;
emitting, with the first light source, the first light of the spectral range onto the sample as it moves through measuring chamber;
detecting, with a first sensor, the first light reflected by the sample as it moves through the measuring chamber;
moving a piston within the measuring chamber between an emptying position and an idle position, the piston in the emptying position to cause emptying of the measuring chamber;
providing a standard to enable referencing of the first sensor when the piston is in the emptying position, the standard coupled to the piston;
providing a second light source upstream of the measuring chamber;
detecting, with a second sensor, a second light from the second light source, the second light indicative of a transmissivity of the sample; and
calculating, with a processing unit, a characteristic of the sample using the detected first light reflected by the sample.

17. The method of claim 16, wherein the casing is at least approximately spherical.

18. The method of claim 16, wherein the first light source is configured to emit at least two different wavelengths of the spectral range in at least one of a simultaneous or successive pattern and the first sensor is configured to sense the at least two wavelengths in the at least one of the simultaneous or successive pattern.

19. The method of claim 18, wherein the at least two wavelengths are resolved by the first sensor or a processing unit associated with the first sensor.

20. The method of claim 16, further including calibrating the first sensor using the standard, the standard movable to a position proximate to or inside the measuring chamber while empty.

21. The method of claim 20, further including providing a drive associated with the standard, the drive configured to move the standard between an active position in which the standard is pushed proximate to or inside the measuring chamber and an inactive position in which the standard is spaced apart from the measuring chamber.

22. The method of claim 16, further including activating a conveyor, the conveyor configured to move the sample through the measuring chamber.

23. The method of claim 16, further including adjusting an operation of an agricultural implement using the calculated characteristic of the sample.

\* \* \* \* \*